United States Patent [19]
Eguchi et al.
[11] 3,922,570
[45] Nov. 25, 1975

[54] DRIVER CIRCUIT FOR MODULATING DIODE

[75] Inventors: Iwao Eguchi; Tadao Shimamura; Yukio Takimoto, all of Tokyo, Japan

[73] Assignee: Nippon Electric Company Limited, Tokyo, Japan

[22] Filed: Dec. 20, 1973

[21] Appl. No.: 426,756

[30] Foreign Application Priority Data

Dec. 23, 1972 Japan ................................ 47-1015

[52] U.S. Cl. ............... 307/270; 307/218; 307/247; 333/7 D

[51] Int. Cl.² ......................................... H03K 17/00

[58] Field of Search ........... 307/270, 218, 247, 320; 333/1.1, 7 D; 330/30 D

[56] References Cited

UNITED STATES PATENTS

| | | | |
|---|---|---|---|
| 3,182,203 | 5/1965 | Miller | 333/1.1 UX |
| 3,303,380 | 2/1967 | Kozikowski | 307/270 |
| 3,381,144 | 4/1968 | Thomas | 307/214 |
| 3,395,359 | 7/1968 | Zachev | 330/30 D |
| 3,437,957 | 4/1969 | Ames | 333/1.1 X |
| 3,506,854 | 4/1970 | Guzak, Jr. | 307/270 |

*Primary Examiner*—John S. Heyman
*Assistant Examiner*—B. P. Davis
*Attorney, Agent, or Firm*—Sughrue, Rothwell, Mion, Zinn & Macpeak

[57] ABSTRACT

A circuit for driving a modulating diode into reverse and forward bias directions. High switching speeds are achieved by connecting a low output impedance driver and a constant current generator to the same terminal of the modulating diode. The current generator provides the entire forward current to the diode when the latter is forward biased. The substantial charge accumulated by the diode during forward bias is swept away at switching time by the low impedance driver.

1 Claim, 6 Drawing Figures

DRIVER CIRCUIT FOR MODULATING DIODE

BACKGROUND OF THE INVENTION

The present invention relates to a modulating diode-driver circuit for use in the direct phase modulation of microwaves and quasi-millimetric waves by pulse signals such as ultrahigh speed PCM signals.

In a system of direct phase modulation of carrier waves, such as microwaves and quasi-millimetric waves for radio PCM communication, phase modulation is generally effected in such manner that a diode provided in a transmission line is turned "on" and "off" by modulating signals so that the propagation path lengths of the carrier at the "on" and "off" times are different. When a varactor diode or a Schottky diode is used as the modulating diode, the capacitance changes relative to the bias voltage, so that the phase changes of modulated waves versus the bias voltages of the diode are not linear. In the case where the phase is to be changed by 180° due to the modulation, the vector locus of the modulated waves does not move onto the opposite side on the Smith chart by passing through the center thereof, but it transfers onto the opposite side by passing through substantially the semicircle with respect to the center. Accordingly, when the diode is driven by a high speed pulse having a finite rise time, jitter arises in the modulated waveforms, and the transmission characteristic is deteriorated.

On the other hand, when a P-I-N diode is employed as the modulating diode, the jitter from the same effect as in the varactor diode and the Schottky diode does not arise because the capacitance of the P-I-N diode does not matter relative to the change of resistance. Jitter due to the modulating pulse pattern effect, however, appears on account of charges which are accumulated during the period of forward bias. It has therefore been very difficult to provide circuits with high operating speeds. It has been proposed, in the prior art, to drive the P-I-N diode by means of an emitter follower which is a low-impedance driver circuit. This method, however, involves the disadvantages that the large driving pulse signals required causes large power consumption in the driver circuit. Although it is also considered that a transistor for driving the diode is operated in the cutoff and saturation regions in order to reduce the heat generation of the driver circuit in the steady state, high speed operation cannot be realized on account of storage charges in the transistor.

It is accordingly an object of the present invention to provide a modulating diode-driver circuit which operates at high speed, which is free from jitter which supplied stable forward bias current to the modulating diode and which has a low power consumption in the steady state even when a P-I-N diode having accumulated charges or any of various modulating diodes with the capacitance varied by the bias voltage is used as the switching diode of a phase modulator for directly phase-modulating microwaves or quasi-millimetric waves.

SUMMARY OF THE INVENTION

According to this invention, there is provided a modulating diode-driver circuit in which a constant-current circuit and a low-impedance output circuit are both connected to the same terminal of a modulating diode. When the modulating diode is to be turned "on" a constant current is supplied thereto from the constant-current circuit and when the diode is to be turned "off," the low-impedance output circuit is coupled to the modulating diode in place of the constant-current circuit. Thus, storage charges in the diode are immediately absorbed by the low-impedance output circuit in the period in which the diode is "off," to make high speed operation possible.

BRIEF DESCRIPTION OF THE DRAWINGS

The present invention will now be described with reference to the accompanying drawings.

FIGS. 3A through 3C are waveform diagrams for explaining the circuit in FIG. 2.

DETAILED DESCRIPTION OF THE PREFERRED EMBODIMENTS

Figures 1, 2, 3, 4:
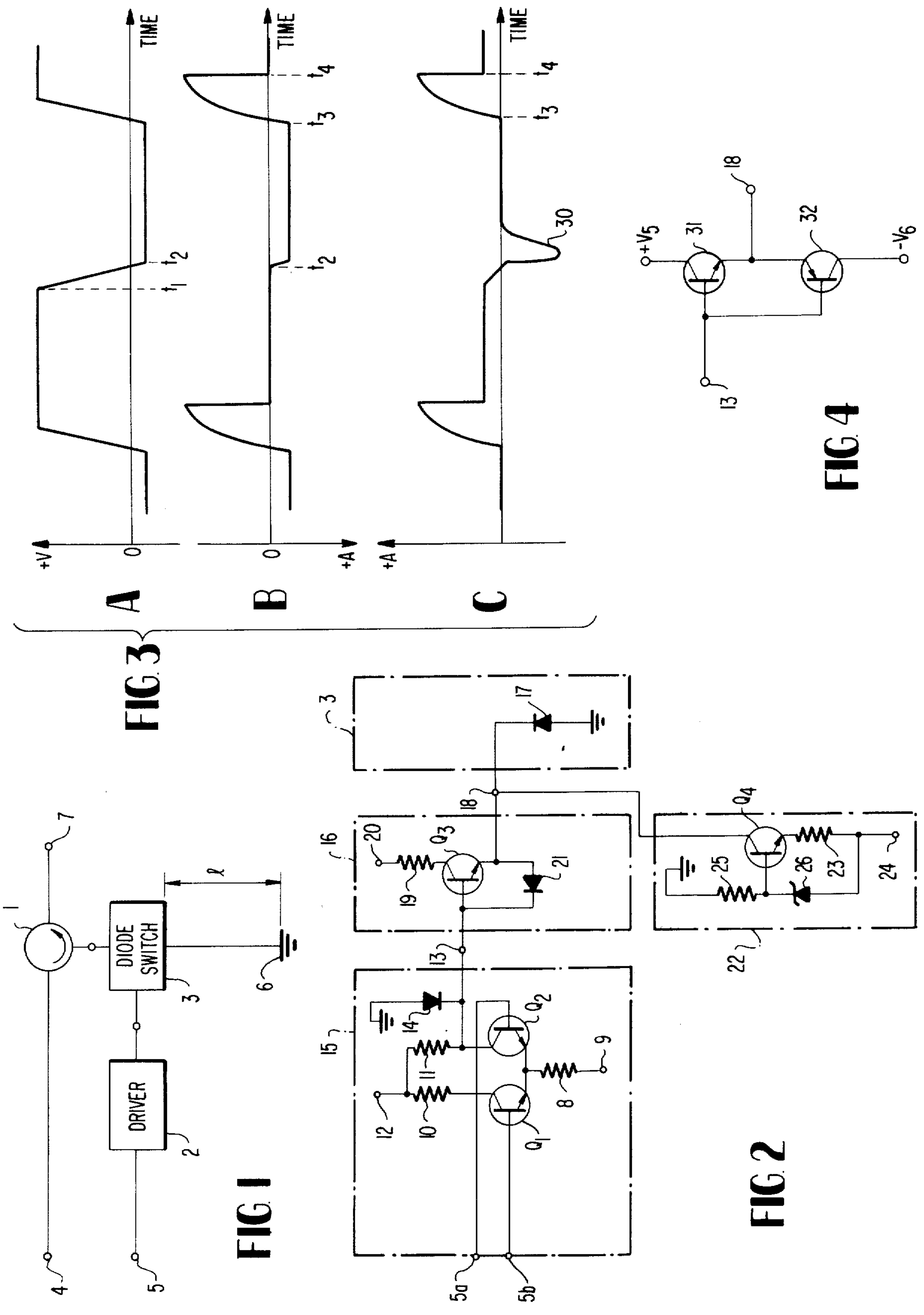
FIG. 1 is a block diagram showing a conventional example of the direct phase modulation system.
FIG. 2 is a circuit diagram showing an embodiment of the modulating diode-driver circuit according to the present invention.
FIG. 4 is a schematic diagram showing another concrete example of a low-impedance output circuit constituting the circuit in FIG. 2.

FIG. 1 is a block diagram for explaining a conventional, direct phase modulation system for microwaves etc. of the type which employs a diode. A microwave carrier fed to a terminal 4 is supplied through a circulator 1 to a diode switch 3. A modulating diode-driver circuit 2 converts modulating pulse signals applied to a modulating input terminal 5 into suitable levels, and renders the diode switch 3 "on" (conductive) and "off" (nonconductive). When the diode switch 3 is "on," the carrier is reflected here, while when the diode switch 3 is "off," the carrier goes to a short-circuit plate 6 and is reflected there. Accordingly, letting $l$ be the distance from the diode switch 3 to the short-circuit plate 6, the phases of the carrier undergo the following phase difference owing to the "on" and "off" operation of the diode switch 3:

$$\Delta\theta = 2l \,.\, 2\pi/\lambda$$

where $\lambda$ denotes the wavelength of the carrier. Consequently, if $l$ is selected as $\lambda/4$, a$[0 - \pi]$ modulation results. If $l$ is selected as $\lambda 18$, a$[0 - \pi/2]$ modulation results. The carrier reflected at the diode switch 3 passes throught the circulator 1 again, and reaches a terminal 7 as a phase modulated output. The manner in which a modulating diode is connected in a transmission line to provide the modulation described is well known and therefore will not be described in detail herein.

Referring to FIG. 2, an embodiment of the modulating diode-driver circuit according to the present invention is shown in connection with the modulating diode 17. FIGS. 3A to 3C are waveform diagrams of signals at various parts of the circuit shown in FIG. 2. FIG. 3A illustrates the waveform of a voltage across modulating diode 17, FIG. 3B the waveform of a current flowing through the modulating diode 17, and FIG. 3C the waveform of an output current of a low-impedance output circuit 16. Modulating input terminal **5*a* and 5*b* to which complementary pulses are applied are respectively connected to the bases of transistors $Q_1$ and $Q_2$ of differential amplifier 15. The emitters of the transistors $Q_1$ and $Q_2$ are commonly connected through a resistor 8 to a power supply terminal 9 of a voltage $-V_1$. The collectors of the transistors $Q_1$ and $Q_2$ are respectively connected through resistors 10 and 11 to a power supply terminal 12 of a voltage $+V_2$. The collector of the transistor $Q_2$ has an output terminal 13 led out therefrom, and is grounded through a diode 14, so that the low level at the output terminal 13 is clamped at a negative potential close to the ground potential by means of the diode 14. In this manner, a pulse amplifier circuit 15 including the transistors $Q_1$ and $Q_2$ is constructed. The output terminal 13 of the amplifier circuit 15 is connected through the low-impedance output circuit 16 to one terminal 18 of the modulating diode 17. The low-impedance output circuit 16 can be constructed of an emitter follower circuit. In the embodiment in FIG. 2, the base of a transistor $Q_3$ is connected to the terminal 13, the collector is connected through a resistor 19 to a power supply terminal 20 of a voltage $+V_3$, and the emitter is connected to a terminal 18. Between the base and emitter of the transistor $Q_3$, a diode 21 is connected in the opposite polarity sense to the characteristic of base-emitter junction diode of the transistor $Q_3$. Further, a constant-current circuit 22 is connected to the terminal 18 of the modulating diode 17. In the embodiment in FIG. 2, the constant-current circuit 22 has such construction that the collector of a transistor $Q_4$ is connected to the terminal 18, that the emitter is connected through a resistor 23 to a power supply terminal 24 of a voltage $-V_4$, and that the base is connected to a bias circuit consisting of a resistor 25 and a Zener diode 26. The other terminal of the modulating diode 17 connected to the terminal 18 is grounded. The complementary pulse signals applied at terminals 5***a* and 5*b* are amplified by the pulse amplifier circuit 15. The positive potential side of an output pulse produced at the terminal 13 becomes a potential substantially equal to a reverse bias potential which the modulating diode 17 requires, while the negative potential side is clamped by the diode 14 and becomes a negative potential close to the ground potential. The operation of the circuit in the steady state condition, i.e., a sufficient time after the change of the input pulse signals, will be considered prior to a discussion of the transient conditions during switching. When the output of the pulse amplifier circuit 15 is on the positive potential side, the modulating diode 17 is reverse-biased through the transistor $Q_3$. Since essentially no current flows through the diode 17 at this time, a current flowing through the transistor $Q_3$ is equal to a current flowing through the constant-current circuit 22. When the output of the pulse amplifier circuit 15 is on the negative potential side, the current of the constant-current circuit 22 gives the modulating diode 17 a forward bias current, and the potential of the terminal 18 is maintained at slightly negative. Although the terminal 13 is also at a negative potential, the absolute value thereof is smaller than that of the potential of terminal 18, so that both the transistor $Q_3$ and the diode 21 in the low-impedance output circuit 16 fall into the non-conductive state. In general, the emitter potential of a transistor immediately follows the change of the base potential when the transistor becomes conductive, whereas the emitter potential does not immediately follow the base potential when the transistor becomes non-conductive. Instead there is a delay in the emitter following the base in the latter condition. In order to diminish the delay, a diode 21 is connected between the base and emitter of the transistor $Q_3$. When the transistor $Q_2$ shifts from the "off" state to the "on" state, the transistor $Q_3$ turns from the "on" state to the "off" state. In that case, the modulating diode 17 is driven from a deep reverse bias towards a forward bias through the diode 21 as will be apparent from the potential waveform during a period from time $t_1$ to time $t_2$ in FIG. 3A which shows the potential of the terminal 18 or the bias potential of the modulating diode 17. At this time, charges having been accumulated in a barrier capacity which occur during period of the reverse bias of the modulating diode 17 and a stray capacity of the circuit connected to the terminal 18 flow into the low-impedance output circuit 16 by way of the diode 21. FIG. 3C illustrates the output current of the low impedance output circuit 16, and a part shown as a negative current 30 in the figure is the aforesaid current which flows into the low-impedance output circuit 16. When the modulating diode 17 is biased in the forward direction, a forward current is supplied from the constant-current circuit 22. This current is shown as a negative constant-curent during a period of $t_2$ - $t_3$ in FIG. 3B which depicts the current flowing through the modulating diode 17. In this figure, the reverse current of the modulating diode 17 is indicated as being positive. Now, when the transistor $Q_2$ turns from the " on" state to the "off" state, the potential of the terminal 13 rises. The transistor $Q_3$ has the base current started flowing, and transfers to the active region. The output impedance with the circuit 16 side viewed from the terminal 18 lowers. Consequently, the charges which have been greatly accumulated in the modulating diode 17 during forward bias are rapidly discharged through the low output impedance circuit 16. The discharge current is shown as a pulsative current during a period of $t_3$ - $t_4$ in FIG. 3B. Another way of viewing the elimination of the accumulated charge is to consider the high current from circuit 16 as a current which flows into the diode 17 upon switching thereby cancelling the accumulated charge. Such current is shown as a current during the period of $t_3$ - $t_4$ in FIG. 3C which illustrates the output current of the low-impedance output circuit 16. When the output current of the low-impedance output circuit reaches a steady value, the modulating diode 17 is given a reverse voltage, and the transistor $Q_3$ need only cause a current to flow into the constant-current circuit 22.

The constant-current circuit 22 can, in actuality, be replaced with a high resistance. Besides, the low-impedance output circuit 16 may be constructed, as shown in FIG. 4, of an N-P-N transistor 31 and a P-N-P transistor 32, whose bases are both connected to the terminal 13 and whose emitters are both connected to the terminal 18.

As stated above, the transistor $Q_3$ employed in the modulating diode-driver circuit according to the present invention is never used in the saturation region, and hence, the driver circuit has excellent speed properties. When the modulating diode 17 is biased in the forward direction, the low impedance output circuit is in the "OFF" state, and the predetermined current is stably supplied by the constant-current circuit 22 even if the voltage-current characteristics of the modulating diode is affected by the ambient temperature change. At the time when the input pulse has changed, the high current flows by the operation of the transistor $Q_3$ or the diode 21, and the modulating diode 17 can thus be rapidly biased in the forward or reverse direction. Except the time of the change of the input pulse, merely the forward current of the modulating diode 17 flows to the constant-current circuit 22, or the current equal in value to the forward current of the diode 17 flows from the low-impedance output circuit 16 to the constant-current circuit 22, which brings forth the further advantage that the current consumption may be extremely low. Accordingly, the invention is not only the most suitable for the driver circuit of the P-I-N diode having accumulated charges, but also effective for the driver circuit of the various diodes, such as Schottky diode and varactor diode, employed in microwave modulator circuits.

What is claimed is:

1. A driver circuit for a modulating diode which comprises, a constant-current circuit for supplying a constant forward current to said modulating diode, and a low-impedance output circuit for applying a reverse bias voltage to said modulating diode, said low-impedance output circuit being in the "off" state when said modulating diode is forward biased, and in which said constant-current circuit and said low-impedance output circuit are both connected to one of the terminals of said modulating diode, said low-impedance output circuit comprising a transistor connected in an emitter follower circuit arrangement and having its emitter connected to said one terminal of said modulating diode, and a diode connected in an opposite polarity sense across the base-emitter junction of said transistor, and said driver circuit further comprising, a differential amplifier circuit having two input terminals adapted to receive complementary modulating pulses and an output terminal, means for clamping negative voltages at said output terminal to a voltage close to zero volts, said output terminal being connected to the input of said emitter follower circuit.

* * * * *

UNITED STATES PATENT AND TRADEMARK OFFICE

CERTIFICATE OF CORRECTION

PATENT NO. : 3,922,570

DATED : November 25, 1975

INVENTOR(S) : Iwao Eguchi et al

It is certified that error appears in the above-identified patent and that said Letters Patent are hereby corrected as shown below:

IN THE SPECIFICATION:

Column 1, line 42 - delete "disadvantages" and insert -- disadvantage --

Column 2, line 42 - delete "$\Delta\theta \neq 2\ell \cdot 2\pi/\lambda$" and insert -- $\Delta\theta = 2\ell \cdot 2\pi/\lambda$ -- line 45 - delete "$\lambda$ 18", and insert -- $\lambda/8$ --

Column 3, line 17 - delete "Q 3" and insert -- $Q_3$ --

Column 4, line 57 - after "22", insert a comma

Signed and Sealed this

*twenty-fourth* Day of *February 1976*

[SEAL]

*Attest:*

RUTH C. MASON
*Attesting Officer*

C. MARSHALL DANN
*Commissioner of Patents and Trademarks*